(12) United States Patent
Yuri

(10) Patent No.: US 8,004,099 B2
(45) Date of Patent: Aug. 23, 2011

(54) METHOD AND APPARATUS FOR CONTROLLING COGENERATION SYSTEM

(75) Inventor: Nobuyuki Yuri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 401 days.

(21) Appl. No.: 12/288,430

(22) Filed: Oct. 20, 2008

(65) Prior Publication Data

US 2009/0127867 A1    May 21, 2009

(30) Foreign Application Priority Data

Nov. 19, 2007    (JP) ................. 2007-299410

(51) Int. Cl.
*F02N 11/06* (2006.01)
*H02P 9/04* (2006.01)

(52) U.S. Cl. .................. 290/40 R; 123/305; 60/691

(58) Field of Classification Search ............ 290/40 R; 123/305; 60/691
See application file for complete search history.

(56) References Cited

U.S. PATENT DOCUMENTS

| | | | | |
|---|---|---|---|---|
| 3,892,975 A | * | 7/1975 | Yannone et al. | 290/40 R |
| 3,911,285 A | * | 10/1975 | Yannone et al. | 290/40 R |
| 3,924,141 A | * | 12/1975 | Yannone et al. | 290/40 R |
| 3,943,373 A | * | 3/1976 | Yannone et al. | 290/40 R |
| 3,955,359 A | * | 5/1976 | Yannone et al. | 60/39.281 |
| 4,195,231 A | * | 3/1980 | Reed et al. | 290/40 R |
| 4,208,591 A | * | 6/1980 | Yannone et al. | 290/40 R |
| 4,242,592 A | * | 12/1980 | Yannone et al. | 290/40 R |
| 5,050,551 A | * | 9/1991 | Morikawa | 123/305 |
| 6,367,260 B1 | * | 4/2002 | Kasai et al. | 60/648 |
| 6,560,965 B1 | * | 5/2003 | Fukumoto et al. | 60/772 |
| 6,739,389 B2 | * | 5/2004 | Nakagawa et al. | 165/293 |
| 6,894,403 B2 | * | 5/2005 | Shinogi | 290/40 R |
| 7,258,107 B2 | * | 8/2007 | Johnson et al. | 123/435 |
| 7,663,256 B2 | * | 2/2010 | Yuri et al. | 290/2 |
| 7,841,322 B2 | * | 11/2010 | Bach | 123/543 |
| 7,885,756 B2 | * | 2/2011 | Livshiz et al. | 701/105 |
| 7,886,712 B2 | * | 2/2011 | Hartmann et al. | 123/305 |
| 7,891,192 B2 | * | 2/2011 | Myers et al. | 60/741 |
| 2003/0006032 A1 | * | 1/2003 | Nakagawa et al. | 165/202 |
| 2005/0061003 A1 | * | 3/2005 | Miyauchi et al. | 60/691 |
| 2007/0018009 A1 | * | 1/2007 | Choi et al. | 237/12 |

(Continued)

FOREIGN PATENT DOCUMENTS

JP    08-004586    1/1996

*Primary Examiner* — Pedro J Cuevas

(74) *Attorney, Agent, or Firm* — Carrier Blackman & Associates, P.C.; Joseph P. Carrier; William D. Blackman

(57) ABSTRACT

In an apparatus (and a method) for controlling a cogeneration system equipped with a generation unit having a generator connectable to an AC power feed line between a commercial power network and an electrical load and an internal combustion engine for driving the generator, and a heat exchanger that exchanges heat with coolant of the engine with exhaust heat from the engine to warm up the coolant, there are provided with an exhaust gas temperature sensor that detects temperature of exhaust gas passing the heat exchanger, a temperature comparator that compares the exhaust gas temperature with a predetermined value and an operation stopper that stops the operation of the cogeneration system when the exhaust gas temperature is found to be less than the predetermined value. With this, it becomes possible to prevent moisture in the exhaust gas from being condensed and accumulated in the exhaust-gas heat exchanger.

4 Claims, 4 Drawing Sheets

U.S. PATENT DOCUMENTS

| | | | |
|---|---|---|---|
| 2009/0045625 A1* | 2/2009 | Yuri ................................. | 290/2 |
| 2009/0045626 A1* | 2/2009 | Yuri ................................. | 290/2 |
| 2009/0107128 A1* | 4/2009 | Yuri ................................. | 60/320 |
| 2009/0107129 A1* | 4/2009 | Yuri et al. ...................... | 60/320 |
| 2009/0108588 A1* | 4/2009 | Yuri et al. .................... | 290/1 A |
| 2009/0126691 A1* | 5/2009 | Bach ........................... | 123/480 |
| 2009/0127868 A1* | 5/2009 | Yuri et al. ................... | 290/40 R |
| 2009/0249769 A1* | 10/2009 | Flanagan et al. ............... | 60/286 |
| 2009/0295157 A1* | 12/2009 | Yuri ................................. | 290/2 |
| 2011/0030673 A1* | 2/2011 | Kanai ........................... | 126/587 |
| 2011/0038396 A1* | 2/2011 | Yi et al. ........................ | 374/171 |
| 2011/0041483 A1* | 2/2011 | Kapparos ........................ | 60/288 |
| 2011/0054704 A1* | 3/2011 | Karpman et al. ............. | 700/282 |
| 2011/0061629 A1* | 3/2011 | Goes et al. .................... | 123/435 |
| 2011/0088674 A1* | 4/2011 | Shutty et al. ............. | 123/568.21 |
| 2011/0093182 A1* | 4/2011 | Weber et al. .................. | 701/102 |

* cited by examiner

METHOD AND APPARATUS FOR CONTROLLING COGENERATION SYSTEM

BACKGROUND OF THE INVENTION

1. Field of the Invention

This invention relates to a method and apparatus for controlling a cogeneration system, particularly to a method and apparatus for controlling operation of a cogeneration system that prevents condensate water from being accumulated.

2. Description of the Related Art

In recent years, cogeneration systems have been developed that are equipped with an internal combustion engine-driven generator for installation in an AC power supply line between a commercial power network and an electrical load for supplying power to the load in interconnection with the power network and also for supplying hot water or the like heated using exhaust heat from the engine to a thermal load. Such a cogeneration system is taught, for example, by Japanese Laid-Open Patent Application No. Hei 8-4586.

In such a cogeneration system, when temperature of coolant of the engine is low in a heat exchanger that exchanges heat with the coolant with exhaust heat to warm up, moisture in the exhaust gas may be condensed and accumulated (pooled) in the system. The accumulated condensate water reacts with components in the exhaust gas and it likely leads to corrosion of the heat exchanger.

SUMMARY OF THE INVENTION

An object of this invention is therefore to overcome the foregoing disadvantage by providing a method and apparatus for controlling a cogeneration system that prevents moisture in the exhaust gas from being condensed and accumulated in a heat exchanger which warms up coolant of an internal combustion engine by heat exchange with exhaust heat.

In order to achieve the object, this invention provides at a first aspect an apparatus for controlling operation of a cogeneration system equipped at least with a generation unit having a generator connectable to an AC power feed line between a commercial power network and an electrical load and an internal combustion engine for driving the generator, and a heat exchanger that exchanges heat with coolant of the engine with exhaust heat from the engine to warm up the coolant to be used for producing hot air or water for a thermal load, comprising: an exhaust gas temperature sensor that detects temperature of exhaust gas passing the heat exchanger; a temperature comparator that compares the detected exhaust gas temperature with a predetermined value; and an operation stopper that stops the operation of the cogeneration system when the detected exhaust gas temperature is found to be less than the predetermined value.

In order to achieve the object, this invention provides at a second aspect a method of controlling operation of a cogeneration system equipped at least with a generation unit having a generator connectable to an AC power feed line between a commercial power network and an electrical load and an internal combustion engine for driving the generator, and a heat exchanger that exchanges heat with coolant of the engine with exhaust heat from the engine to warm up the coolant to be used for producing hot air or water for a thermal load, comprising the steps of: detecting temperature of exhaust gas passing the heat exchanger; comparing the detected exhaust gas temperature with a predetermined value; and stopping the operation of the cogeneration system when the detected exhaust gas temperature is found to be less than the predetermined value.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A method and apparatus for controlling a cogeneration system according to an embodiment of the invention will now be explained with reference to the attached drawings.

Figure 1:
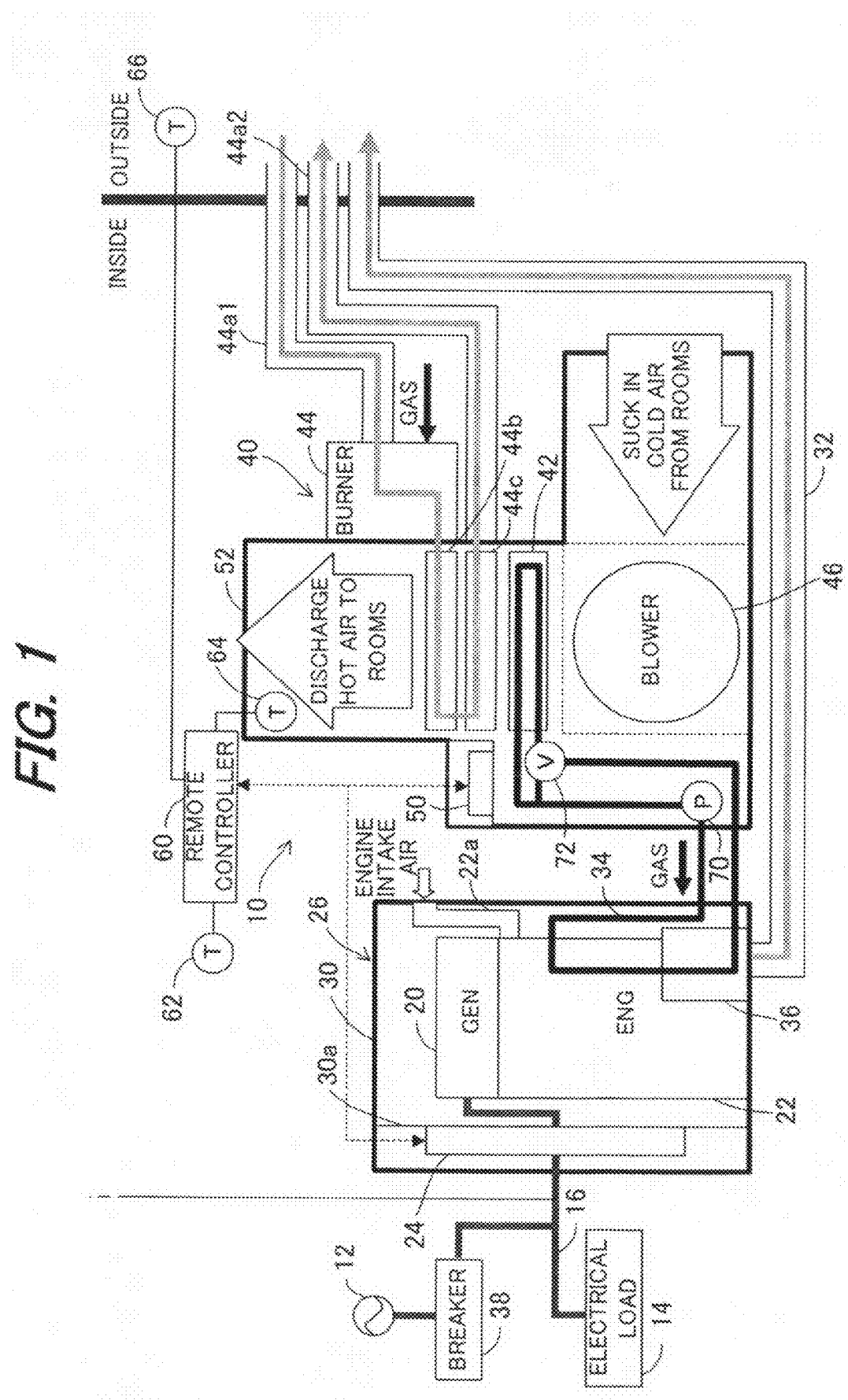
FIG. 1 is a block diagram giving an overall view of a method and apparatus for controlling a cogeneration system according to an embodiment of this invention.

FIG. 1 is a schematic diagram showing a method and apparatus for controlling a cogeneration system according to an embodiment of this invention.

As illustrated, the cogeneration system (designated by reference numeral 10) is equipped with a power generation unit 26 having a generator (GEN) 20 constituted of multipolar coils and connectable to an AC power feed line (power line) 16 between a commercial power source (commercial power network) 12 and domestic electrical loads (electrical loads) 14, an internal combustion engine (ENG; hereinafter called "engine") 22 driving the generator 20 and a power controller 24. The cogeneration system 10 is installed indoors.

The power source 12 generates or outputs single-phase, three-wire, 100/200 V, 50 Hz (or 60 Hz) AC power. The generation unit 26 is integrally formed and housed in a generation unit case 30.

Specifically, as shown in FIG. 1, the generation unit case 30 is divided into two compartments by a partition 30a. The right compartment in the drawing accommodates the generator 20 and engine 22 to be arranged above and below in a vertical direction in the axis of gravity, and the left compartment accommodates the power controller 24. The power controller 24 is isolated from the engine 22, i.e., installed in one of the compartments which does not house the engine 22 so that heat from the engine 22 can be blocked as much as possible.

The engine 22 is a single-cylinder, four-cycle, water-cooled, spark-ignition, OHV engine that runs on the city gas or LP (liquefied petroleum) gas and has a displacement of, for example, 163 cc. Although not shown in the drawing, the cylinder head and cylinder block of the engine 22 is laid in the lateral (horizontal) direction in the generation unit case 30, and a piston is reciprocatingly accommodated therein.

Sucked air supplied from an air intake duct 22a is mixed with gas (indicated as GAS in FIG. 1) supplied from a gas supply source via a solenoid valve (not shown) by using a mixer. The air-fuel mixture thus produced flows into a combustion chamber and burns upon ignition by an ignition plug (not shown) to drive the piston, thereby rotating the crankshaft connected to the piston in a longitudinal (vertical) direction in the generation unit case 30. The generated exhaust gas passes through an exhaust pipe (not shown in FIG. 1) and an exhaust duct 32 connected to the generation unit case 30 and is discharged to the exterior of a room(s).

A coolant circulation passage 34 is formed to run through a heating region such as the cylinder block of the engine 22 and the coolant composed of antifreeze liquid circulates therethrough. The coolant exchanges heat with the heating region to raise its temperature, as cooling the engine 22, and passes through an exhaust-gas heat exchanger 36 installed along the exhaust pipe to be further heated.

A flywheel is attached to the upper end of the crankshaft and the inside thereof is installed with the generator 20. The generator 20 produces alternating current when rotating relatively to the flywheel. The output of the generator 20 is sent to the power controller 24.

Although not shown in the drawing, the power controller 24 comprises an electronic control unit (ECU) constituted as a microcomputer, an inverter and a DC/DC converter. The inverter inverts the DC output of the DC/DC converter to 100/200 V AC power (single phase).

The outside of the generation unit case 30 is installed with an operation panel (not shown) having a warning lamp and the like, and a main switch (not shown) that is disposed to be operable by the operator and, when turned off, stops the operation of the cogeneration system 10. The ECU of the power controller 24 controls the main switch to be turned off for stopping the operation of the cogeneration system 10 upon establishment of a specific condition.

The output of power generation of the generation unit 26 is 1.0 kW or thereabout. The output of the inverter is connected to the power feed line 16 via a breaker 38. When the generator 20 is supplied with power from the power source 12 via the inverter, it functions as a starter motor for cranking the engine 22. The ECU of the power controller 24 switches the function of the generator 20 between the starter and the generator, and controls the operation of the engine 22 and the like.

The cogeneration system 10 includes a hot-air heating unit 40 in addition to the generation unit 26.

The hot-air heating unit 40 comprises an exhaust heat exchanger 42 connected to the coolant circulation passage 34 of the engine 22, a burner 44, a sensible heat exchanger 44b and latent heat exchanger 44c connected to an intake pipe 44a1 and exhaust pipe 44a2 of combustion gas of the burner 44, a blower 46 that supplies intake air to the exhaust heat exchanger 42 and both the sensible heat exchanger 44b and latent heat exchanger 44c to exchange heat and supplies the generated hot air to the interior of the room(s) through a hot-air passage, and a hot-air heating unit controller 50.

The hot-air heating unit 40 is housed in a hot-air heating unit case 52 and connected to each room through the hot-air passage (not shown).

The foregoing configuration is explained separately. The generation unit 26 is connected to the hot-air heating unit 40 through the coolant circulation passage 34. Specifically, the coolant circulation passage 34 extends from the engine 22 toward the hot-air heating unit 40, is connected to the exhaust heat exchanger 42 positioned near the blower 46, and returns to the engine 22. In the exhaust heat exchanger 42, air flowing through the coolant circulation passage 34 is heat-exchanged with cold air of the rooms sucked in by the blower 46.

Cold air is warmed up by the heat exchange in the exhaust heat exchanger 42 to be hot air and supplied to each room by the blower 46 through an air duct (not shown) and the hot-air passage, thereby warming up the rooms.

The burner 44 sucks in air from the exterior or outside through the intake pipe 44a1 by using a combustion fan and mixes the sucked air with supply gas to burn. The generated combustion gas passes through the sensible heat exchanger 44b and latent heat exchanger 44c and is discharged from the exhaust pipe 44a2 to the exterior.

The sensible heat exchanger 44b and latent heat exchanger 44c warm up air passing through the air duct (not shown) of the blower 46 by the heat exchange. Specifically, the sensible heat exchanger 44b releases heat above the dew point of combustion gas and the latent heat exchanger 44c releases heat at or below the dew point. Condensate water generated in the latent heat exchanger 44c is discharged to the exterior through a drain pipe (not shown).

The blower 46 sucks in cold air from the rooms and supplies hot air which has been warmed up by the heat exchange by the exhaust heat exchanger 42 and further heated and warmed up by combustion by the burner 44, to the rooms through the air duct for warming the rooms.

The hot-air heating unit controller (hot-air controller) 50 is equipped with an ECU (electronic control unit) constituted as a microcomputer similarly to the ECU of the power controller 24. The ECU of the hot-air controller 50 is connected to the ECU of the power controller 24 to be able to communicate and also connected to a remote controller(s) (remote controllers installed in the respective rooms are collectively assigned by 60) to be able to communicate. The remote controller 60 is operated by the user to set a desired room temperature or the like.

In FIG. 1, "T" indicates temperature sensors 62 (sensors in the rooms are collectively assigned by 62), 64, 66, "P" indicates an exhaust-heat pump 70 and "V" indicates a valve 72 and they are electrically connected to the hot-air controller 50, although signal lines are partially omitted in the drawing.

The hot-air controller 50 drives the exhaust-heat pump 70 and valve 72 to pump the coolant flowing through the coolant circulation passage 34 to the exhaust heat exchanger 42 for exchanging heat between circulating water in the coolant circulation passage 34 and the cold air of the rooms sucked in by the blower 46.

In order to prevent corrosion due to accumulation of condensate water in the exhaust-gas heat exchanger 36 and taking the engine oil durability into account, the hot-air controller 50 controls such that the coolant temperature at the inlet of the engine 22 becomes, for example, 70° C.

The explanation will be made on the operation of the hot-air controller 50 and power controller 24 when the cogeneration system 10 is operated in interconnection with the power source 12. In the case of heating operation, the hot-air controller 50 compares outputs of the temperature sensors 62 installed in the rooms with temperature set by the user through the remote controllers 60, and sends a command to the power controller 24 to operate the generation unit 26 when the detected temperature is lower than the set temperature, while terminating the operation when the detected temperature has reached the set temperature. Subsequently, this procedure is repeated.

When the detected room temperature does not reach the set temperature after a lapse of a specified time period or when a difference between the detected temperature and set temperature exceeds a predetermined value, the hot-air controller 50 determines that the operation only by the generation unit 26 is insufficient and operates the burner 44 to burn for supplying hot air heated by the burner 44 to the rooms by the blower 46 until reaching the set temperature.

When electric power from the commercial power network (commercial power source) 12 is insufficient, the power controller 24 operates the generation unit 26 to supply power to the electrical load 14.

The explanation is made on the operation of the power controller 24 when the cogeneration system 10 is operated independently of the power source 12, i.e., in no interconnection with the power source 12, in the case, for example, where a commercial power network outage occurs. The power controller 24 activates the generation unit 26 simultaneously with occurrence of outage, and subsequently regulates the power output so as to keep constant voltage in response to increase/decrease of the electrical load.

When the generation unit 26 is operated, including a period during engine idling with no power output, the thermal output is generated. The hot-air controller 50 conducts the heating operation, burner operation and the like on thermal demand, similarly to the above-mentioned case of working together with the commercial power source 12.

Figure 2:
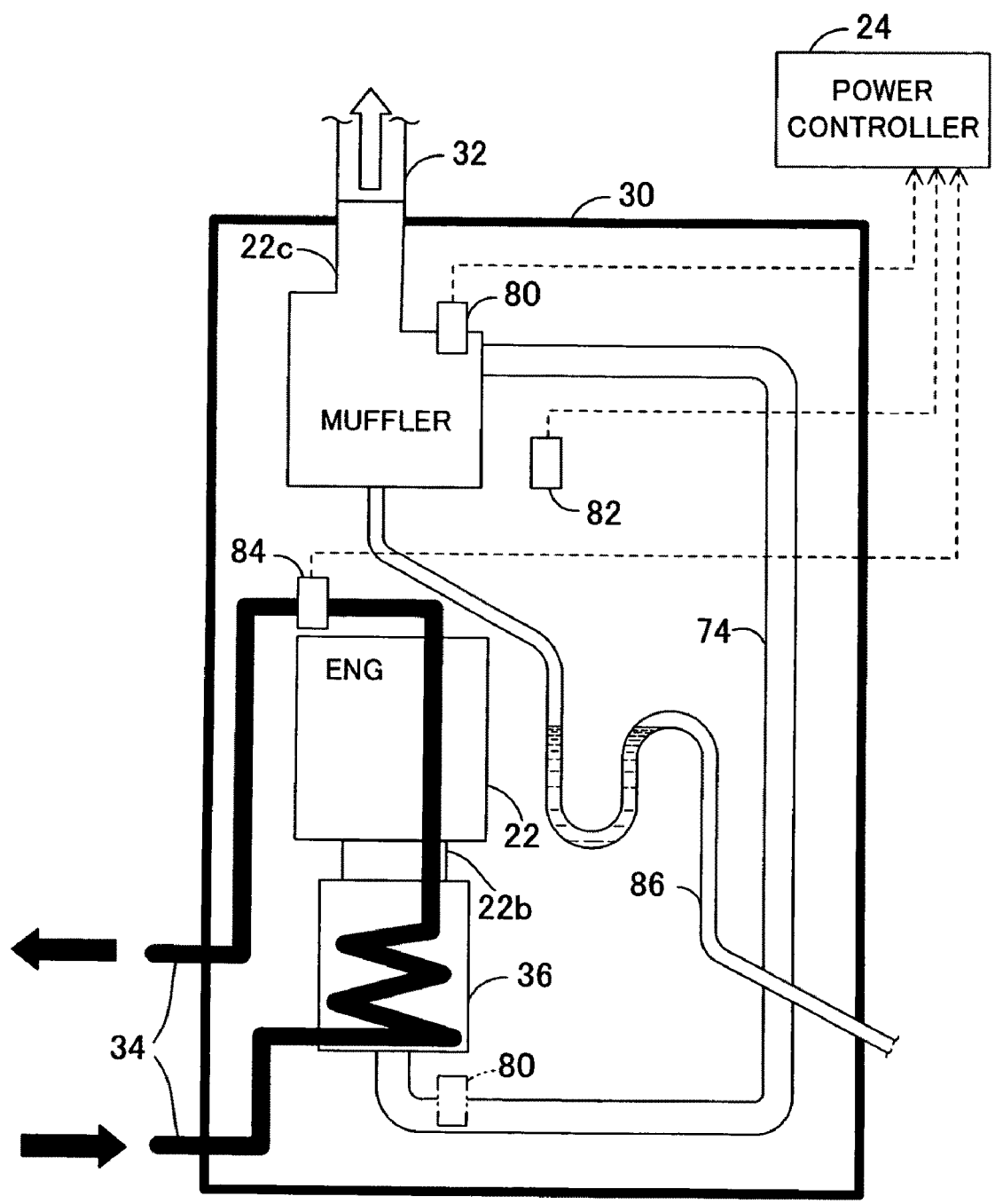
FIG. 2 is an explanatory view schematically showing connection between an internal combustion engine housed in a generation unit case and an exhaust-gas heat exchanger shown in FIG. 1.

FIG. 2 is an explanatory view schematically showing connection between the engine 22 housed in the generation unit case 30 and the exhaust-gas heat exchanger 36. In FIG. 2, the generator 20 is omitted for ease of illustration, and input/output directions of the coolant circulation passage 34 and a position of the exhaust duct 32 differ from those in FIG. 1. Specifically, FIG. 2 is not a view showing the actual allocation of the engine 22 etc. in a vertical direction but a diagram merely schematically showing the connection relationship.

As shown in FIG. 2, the exhaust-gas heat exchanger 36 is installed along the exhaust pipe 22b of the engine 22. The coolant circulation passage 34 runs through the heating region such as the cylinder block of the engine 22 and extends to the hot-air heating unit 40, such that the coolant flowing therethrough is warmed up by the heat exchange.

The exhaust-gas heat exchanger 36 is connected to a muffler 22c through a hose 74 to be airtight and the muffler 22c is connected to the exhaust duct 32 to be airtight. The exhaust gas from the engine 22 passes through the exhaust-gas heat exchanger 36 and hose 74 and, as being silenced by the muffler 22c, is discharged from the exhaust duct 32 to the exterior.

Figure 3:
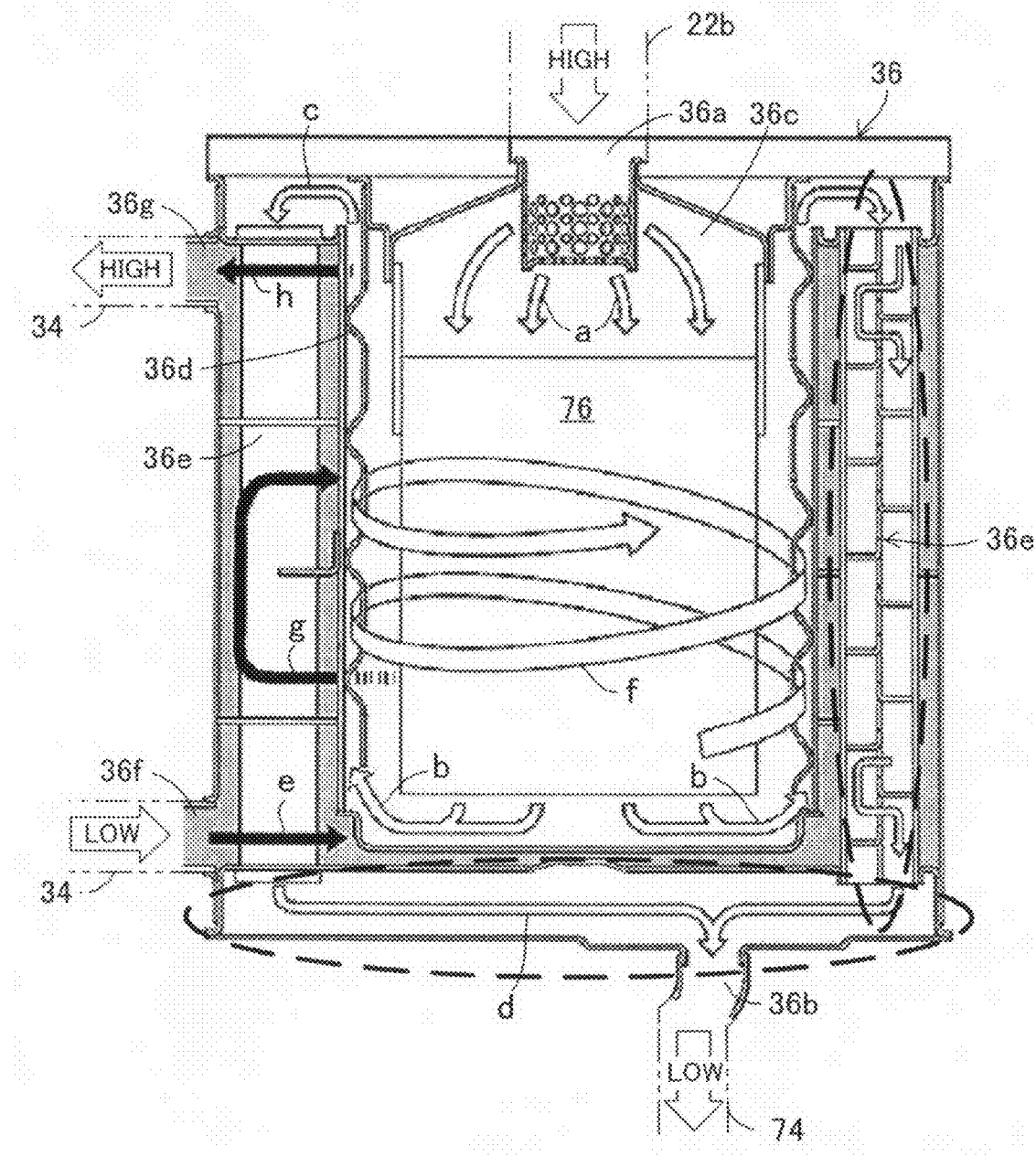
FIG. 3 is a sectional view showing the actual structure of the exhaust-gas heat exchanger that is schematically shown in FIG. 2.

FIG. 3 is a sectional view showing the actual structure of the exhaust-gas heat exchanger 36 that is schematically shown in FIG. 2.

As illustrated, the exhaust-gas heat exchanger 36 of a cylindrical shape is bored at its top portion in the drawing with an upper hole 36a connected to the exhaust pipe 22b of the engine 22 and at its bottom with a lower hole 36b connected to the hose 74. A chamber 36c is formed between the upper and lower holes 36a, 36b. The chamber 36c is divided by a perforated partition 36d to define a central section which houses a three-way catalytic converter 76, and a circumference section which is formed with a heat exchanger tube 36e of honeycomb type.

The exhaust gas exhausted from the engine 22 flows through the three-way catalytic converter 76 as indicated by arrows a, flows upward between the partition 36d and heat exchanger tube 36e as indicated by arrows b, then flows through the heat exchanger tube 36e as indicated by an arrow c, and finally is discharged from the lower hole 36b as indicated by an arrow d.

The coolant circulation passage 34 is connected to a lateral side of the exhaust-gas heat exchanger 36. The coolant at low temperature enters the exhaust-gas heat exchanger 36 through a hole 36f as indicated by an arrow e, flows in a spiral in the heat exchanger tube 36e as indicated by arrows f, g to be warmed up by the heat exchange with the exhaust gas, and then returns to the coolant circulation passage 34 through a hole 36g as indicated by an arrow h.

As explained in the foregoing, taking into account prevention of corrosion caused by accumulated condensate water in the exhaust-gas heat exchanger 36, the hot-air controller 50 controls such that temperature of the coolant flowing through the coolant circulation passage 34 becomes, for example, 70° C. at the inlet of the engine 22, but in the case where the temperature at the inlet lowers for some reason, moisture in the exhaust gas may be condensed. The condensate water thus generated is accumulated in the exhaust-gas heat exchanger 36 at a region having the heat exchanger tube 36e or at the bottom, as indicated by a dashed line, and the exhaust-gas heat exchanger 36 may be corroded by a chemical reaction with exhaust components. This invention is intended to solve the above problem.

The explanation of FIG. 2 is resumed. As illustrated, for the above-mentioned purpose, a first temperature sensor 80 installed in the muffler 22c produces an output or signal indicative of temperature Te of the exhaust gas sent through the hose 74 that connects the exhaust-gas heat exchanger 36 with the muffler 22c (i.e., the temperature Te of the exhaust gas passing the exhaust-gas heat exchanger 36), and a second temperature sensor 82 is installed at an appropriate position in the generation unit case 30 to produce an output or signal indicative of temperature Ta in the case 30.

Further, a coolant temperature sensor 84 is installed in the coolant circulation passage 34 at a position adjacent to a heating region such as the cylinder block of the engine 22, and produces an output or signal indicative of coolant temperature Tw at the position. The outputs of the sensors 80, 82, 84 are sent to the power controller 24 to be inputted to its ECU. Although the engine 22 is installed with a crank angle sensor and other sensors for detecting operating parameters and outputs of those sensors are also sent to the ECU of the power controller 24, illustration thereof is omitted.

A condensate water hose 86 is connected to the muffler 22c to discharge condensate water that is generated from condensed moisture of the exhaust gas in the muffler 22c, to the exterior of the generation unit case 30. Unlike the condensate water accumulated in the exhaust-gas heat exchanger 36, the condensate water in the muffler 22c is naturally generated in this structure, so it is discharged through the condensate water hose 86.

Figure 4:
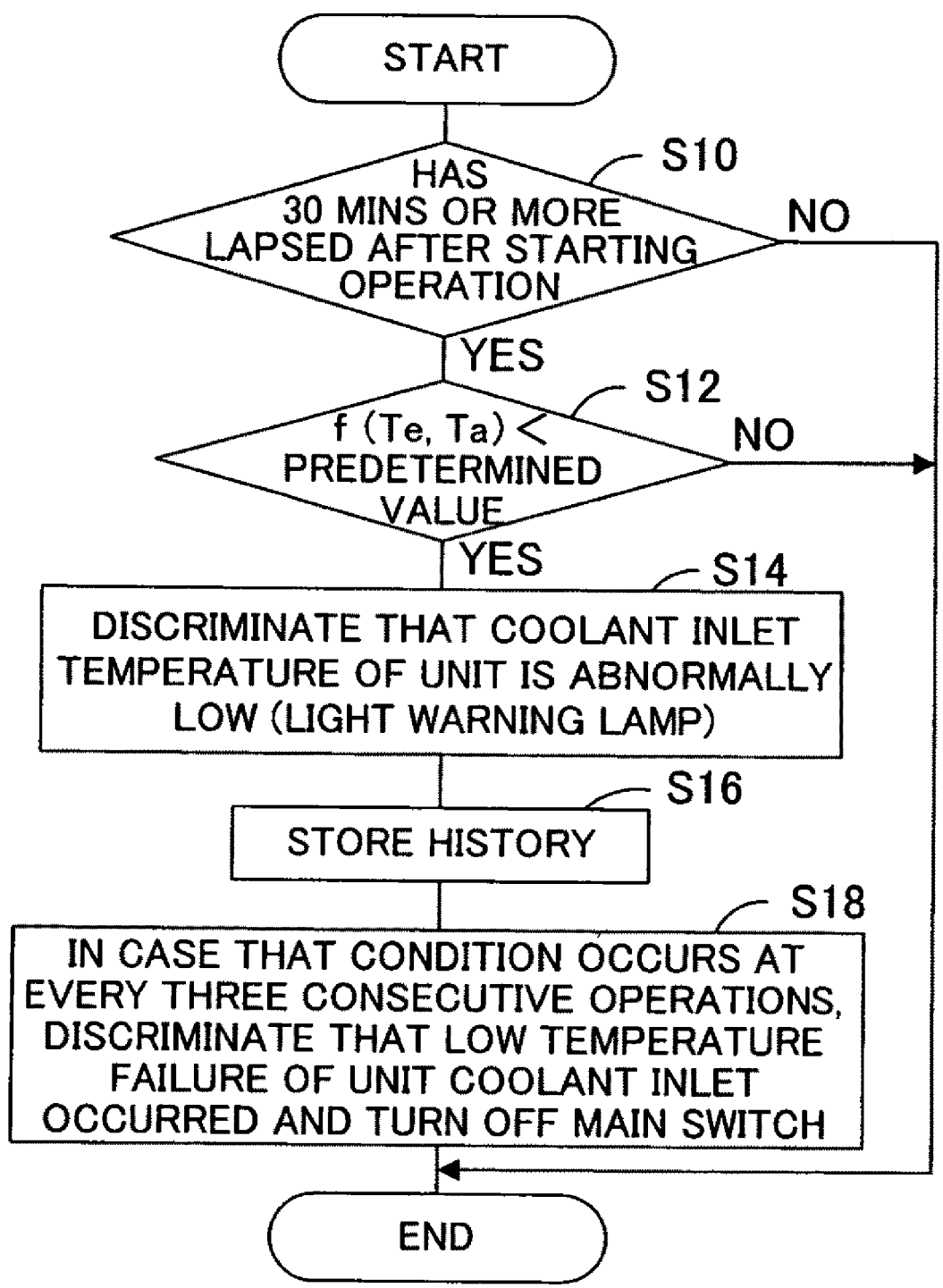
FIG. 4 is a flowchart showing the processing for preventing accumulation of condensate water conducted by an ECU in a generation controller shown in FIG. 1.

FIG. 4 is a flowchart showing the processing for preventing accumulation of condensate water conducted by the ECU in the generation controller 24.

In S10, it is determined whether a time period of 30 minutes or more has elapsed after the generation unit 26 is started to operate by activating the engine 22, i.e., whether the operation of the generation unit 26 is thermally stabilized.

When the result in S10 is NO, the remaining steps are skipped and when the result is YES, the program proceeds to S12, in which the exhaust gas temperature Te detected by the first temperature sensor 80 is compared with a predetermined value to determine whether the detected exhaust gas temperature Te is less than the predetermined value.

The predetermined value is set to temperature at which moisture in the exhaust gas is likely condensed in the exhaust-gas heat exchanger 36 and corrected with the case temperature Ta detected by the second temperature sensor 82. Since the exhaust gas temperature Te is detected apart from the exhaust-gas heat exchanger 36 and the detected value could not be a value accurately indicating the exhaust gas temperature in the interior of the exhaust-gas heat exchanger 36, this processing is conducted to compensate it.

For instance, the predetermined value is corrected to 55° C. in the case that the case temperature Ta is at or below 10° C. and to 65° C. in the case that the temperature Ta is at or above 30C. Therefore, when the predetermined value is corrected to 55° C., it is determined in S12 whether the detected exhaust gas temperature Te is less than 55° C.

The first temperature sensor 80 can be installed in the hose 74 in the vicinity of a region immediately beneath the exhaust-gas heat exchanger 36 to detect temperature of the exhaust gas passing through the exhaust-gas heat exchanger 36, as indicated by an imaginary line in FIG. 2. In this case, the second temperature sensor 82 is not necessary and the predetermined value is set to, e.g., 60° C.

The explanation of FIG. 4 is resumed. When the result in S12 is NO, the remaining steps are skipped and when the result is YES, the program proceeds to S14, in which it is discriminated that the coolant temperature at the inlet of the generation unit 26 (temperature in the vicinity of the hole 36f in FIG. 3) is abnormal (i.e., even though the temperature should be set to 70° C. or higher, it is not as it should be), and the above-mentioned warning lamp is lit if needed.

Next, in S16, history is stored, i.e., a number of operations in which the exhaust gas temperature Te is less than the predetermined value (the inlet temperature is abnormal) is counted or stored.

The processing from S10 to S14 is repeated every time the cogeneration system 10 is activated or operated. Then in S18, when the foregoing processing is conducted upon three consecutive activations of the cogeneration system 10, i.e., the exhaust gas temperature Te is found to be less than the predetermined value (the inlet temperature is abnormal) at every three consecutive operations (in other words, a number of times in which the detected exhaust gas temperature is found to be less than the predetermined value is counted and the count reaches a prescribed number, i.e., three), it is discriminated to be occurrence of a low temperature failure of the coolant inlet of the generation unit 26 and the main switch is turned off to stop the operation of the cogeneration system 10.

Specifically, when the foregoing specific condition occurs, it is discriminated that the condensate water is generated and if the operation is continued, the generated condensate water should be accumulated and cause corrosion of the exhaust-gas heat exchanger 36 in the future, so the main switch is turned off to stop the operation.

As stated above, this embodiment is configured to have an apparatus (and a method) for controlling operation of a cogeneration system (10) equipped at least with a generation unit (26) having a generator (20) connectable to an AC power feed line (16) between a commercial power network (12) and an electrical load (14) and an internal combustion engine (22) for driving the generator, and a heat exchanger (exhaust-gas heat exchanger 36) that exchanges heat with coolant of the engine with exhaust heat from the engine to warm up the coolant to be used for producing hot air or water for a thermal load, comprising: an exhaust gas temperature sensor (first temperature sensor 80) that detects temperature Te of exhaust gas passing the heat exchanger; a temperature comparator that compares the detected exhaust gas temperature Te with a predetermined value (ECU of the power controller 24, S10 to S12); and an operation stopper that stops the operation of the cogeneration system when the detected exhaust gas temperature Te is found to be less than the predetermined value (ECU of the power controller 24, S14 to S18). Since the predetermined value is set to temperature at which moisture in the exhaust gas is likely condensed, it becomes possible to prevent moisture in the exhaust gas from being condensed and accumulated in the exhaust-gas heat exchanger 36 which exchanges heat with the coolant of the engine 22 with exhaust heat to warm up the coolant, and accordingly corrosion of the exhaust-gas heat exchanger 36 can be prevented, thereby enabling to improve durability and reduce maintenance cost.

The apparatus further includes a second temperature sensor (82) that detects temperature Ta of a case (30) that houses the generation unit and the heat exchanger; and a corrector that corrects the predetermined value with the detected temperature Ta in the case. Since the predetermined value is corrected with the case temperature Ta when the exhaust gas temperature Te is detected apart from the outlet (hole 36f) of the exhaust-gas heat exchanger 36, in addition to the foregoing effects, it becomes possible to prevent moisture in the exhaust gas from being condensed and accumulated regardless of distance between the detecting point of the exhaust gas temperature Te and the outlet (hole 36f) of the exhaust-gas heat exchanger 36.

The apparatus further includes a counter that counts a number of times in which the detected exhaust gas temperature Te is found to be less than the predetermined value (ECU of the power controller 24, S16), and the operation stopper stops the operation when the count has reached a prescribed number (three times). With this, in addition to the foregoing effects, the operation is not stopped more than necessary.

It should be noted that although the operation is stopped if the specific condition occurs every time in the prescribed number of operations consecutively, i.e., at every three consecutive operations, in the case that the specific condition intermittently occurs, the operation can be stopped upon three-time occurrences of the condition in total. The number of three times is also only an example and not limited thereto.

It should be noted that although the hot-air controller 50 controls such that the coolant temperature at the inlet of the engine 22 becomes 70° C., and the generation controller 24 compares the exhaust gas temperature Te detected in the processing for preventing condensate water accumulation with 55° C., 65° C. or 60° C., these temperatures vary in accordance with specification or configuration, such as power generation capacity, of the cogeneration system 10.

It should also be noted that, instead of a gas engine using gas fuel such as the city gas or LP (liquefied petroleum) gas exemplified as the power source of the generator 20, it can be an engine using gasoline fuel or the like. Further, although the output of the generator 20, displacement of the engine 22 and the like are shown by specific values, they are only examples and not limited thereto.

Japanese Patent Application No. 2007-299410 filed on Nov. 19, 2007, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling operation of a cogeneration system equipped at least with a generation unit having a generator connectable to an AC power feed line between a commercial power network and an electrical load and an internal combustion engine for driving the generator, and a heat exchanger that exchanges heat with coolant of the engine with exhaust heat from the engine to warm up the coolant to be used for producing hot air or water for a thermal load, comprising:

an exhaust gas temperature sensor that detects temperature of exhaust gas passing the heat exchanger;

a second temperature sensor that detects temperature of a case that houses the generation unit and the heat exchanger;

a corrector that corrects a predetermined value to a corrected value using the detected temperature in the case;

a temperature comparator that compares the detected exhaust gas temperature with the corrected value; and an operation stopper that stops the operation of the cogeneration system when the detected exhaust gas temperature is found to be less than the corrected value.

2. The apparatus according to claim 1, further including:

a counter that counts a number of times in which the detected exhaust gas temperature is found to be less than the predetermined value, and the operation stopper stops the operation when the count has reached a prescribed number.

3. A method of controlling operation of a cogeneration system equipped at least with a generation unit having a generator connectable to an AC power feed line between a commercial power network and an electrical load and an internal combustion engine for driving the generator, and a heat exchanger that exchanges heat with coolant of the engine with exhaust heat from the engine to warm up the coolant to be used for producing hot air or water for a thermal load, comprising the steps of:

detecting temperature of exhaust gas passing the heat exchanger;

detecting temperature in a case that houses the generation unit and the heat exchanger;

correcting a predetermined value to a corrected value using the detected temperature in the case;

comparing the detected exhaust gas temperature with the corrected value;

and stopping the operation of the cogeneration system when the detected exhaust gas temperature is found to be less than the corrected value.

4. The method according to claim 3, further including the step of:

counting a number of times in which the detected exhaust gas temperature is found to be less than the predetermined value, and the step of operation stopping stops the operation when the stored number has reached a prescribed number.

* * * * *